(12) United States Patent
Motosko et al.

(10) Patent No.: US 9,255,444 B2
(45) Date of Patent: Feb. 9, 2016

(54) HURRICANE RESISTANT FABRIC CLAMPS

(76) Inventors: Stephen J. Motosko, Sarasota, FL (US); Steve Motosko, III, Sarasota, FL (US); Catherine Motosko, Sarasota, FL (US)

( * ) Notice: Subject to any disclaimer, the term of this patent is extended or adjusted under 35 U.S.C. 154(b) by 242 days.

(21) Appl. No.: 13/528,141

(22) Filed: Jun. 20, 2012

(65) Prior Publication Data

US 2012/0318469 A1    Dec. 20, 2012

Related U.S. Application Data

(60) Provisional application No. 61/498,680, filed on Jun. 20, 2011.

(51) Int. Cl.
*F16M 13/00* (2006.01)
*E06B 9/52* (2006.01)
*E06B 9/00* (2006.01)

(52) U.S. Cl.
CPC ............. *E06B 9/52* (2013.01); *E06B 2009/005* (2013.01); *E06B 2009/527* (2013.01)

(58) Field of Classification Search
USPC ................... 248/208, 220.1, 220.21, 220.22, 248/223.41, 316.1, 316.5, 316.7; 24/326, 24/489, 545, 561, 562; 52/202; 49/463, 49/464, 465, 502
See application file for complete search history.

(56) References Cited

U.S. PATENT DOCUMENTS

| | | | | | |
|---|---|---|---|---|---|
| 2,055,348 | A | * | 9/1936 | Hansen | 49/386 |
| 2,244,136 | A | * | 6/1941 | Zercher | 16/268 |
| 2,555,329 | A | * | 6/1951 | Foster | 292/263 |
| 6,131,354 | A | * | 10/2000 | Thompson | 52/511 |
| 6,585,208 | B1 | * | 7/2003 | Fraser | 248/251 |
| 7,337,582 | B1 | * | 3/2008 | Klotz | 49/465 |
| 8,082,706 | B2 | * | 12/2011 | Myny et al. | 52/202 |

* cited by examiner

*Primary Examiner* — Steven Marsh

(74) *Attorney, Agent, or Firm* — Dinsmore & Shohl LLP; Thomas E. Anderson

(57) ABSTRACT

A storm protection system for covering the opening of a building with a flexible material. The system includes a bracket having a first panel and a second panel, the panels each having a surface, the first surface and the second surface of the bracket having a plurality of protrusions disposed thereon (and various embodiments thereof). Another embodiment utilizing at least one inclined planar portion connected to a planar portion of the bracket at the first edge of the inclined planar portion and an elongated member connected to the at least one inclined planar portion for securing a flexible material. A last embodiment includes a planar bracket having a first end and a second end, the planar bracket made of a resilient material. All embodiments operable to hold a flexible material (fabric, screen . . . etc.) over an opening to a building to protect the opening during a storm.

14 Claims, 11 Drawing Sheets

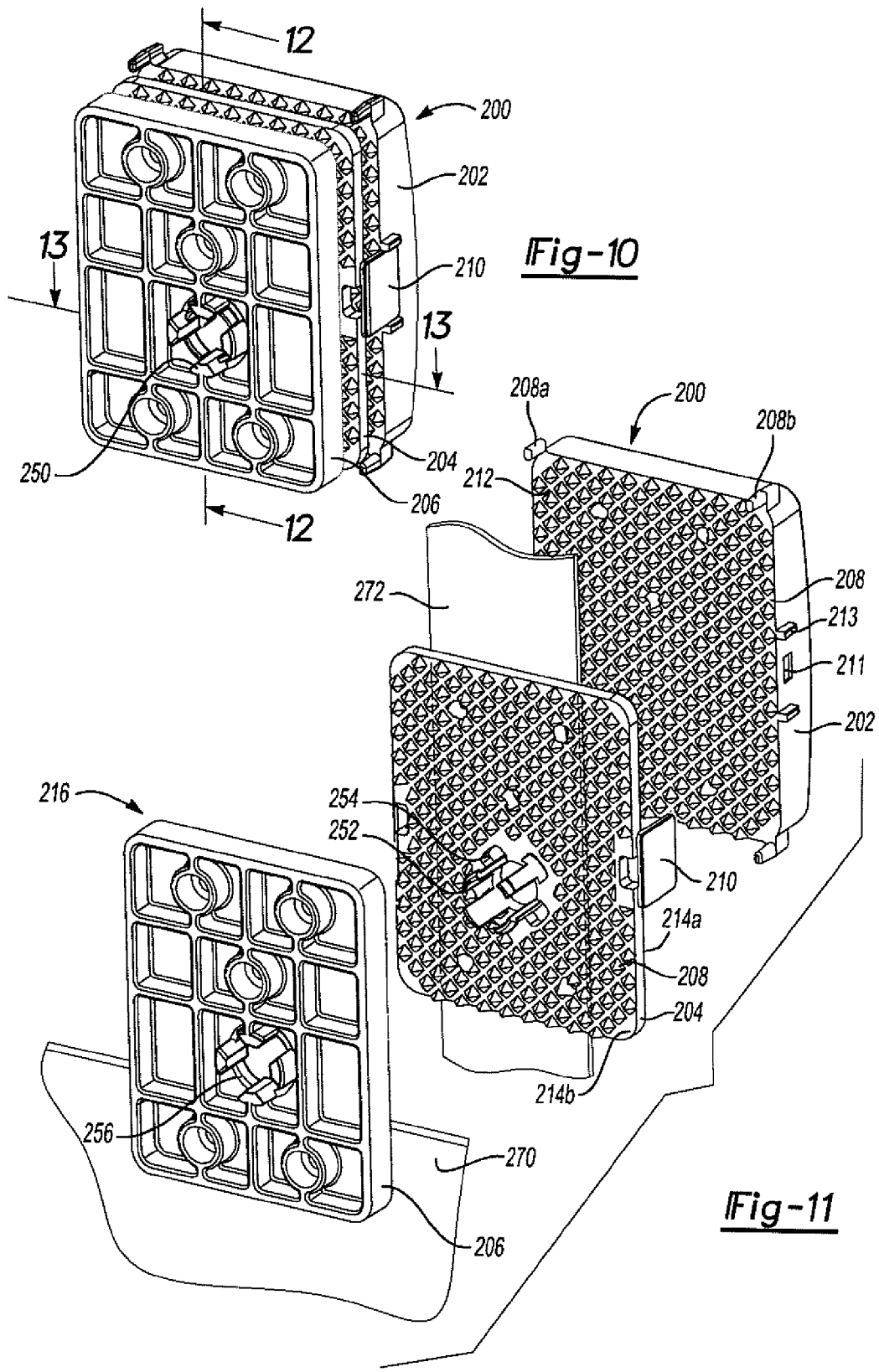

HURRICANE RESISTANT FABRIC CLAMPS

CROSS-REFERENCE TO RELATED APPLICATIONS

This application claims priority of U.S. Provisional Patent Application Ser. No. 61/498,680 filed Jun. 20, 2011, which is incorporated herein by reference.

FIELD OF THE INVENTION

This invention generally relates to methods and apparatus for covering windows in hurricane situations. More particularly, this invention relates to an apparatus for securing fabric/screen over a window or other opening.

BACKGROUND OF THE INVENTION

It is commonly known in the art to cover either residential or commercial building windows with panels, boards, or fabric to protect said windows during the high winds produced by a hurricane or other tropical storm. The process of covering windows with fabric, wood (or plywood), or otherwise is commonly known as boarding windows. Boarding windows reduces overall damage to a home or commercial building by reducing damage caused by wind and rain. Covering or boarding windows also reduces damage to a residential home or commercial building by preventing debris from flying through a window. Utilizing fabric to cover windows in preparation for a strong storm or hurricane is highly advantageous in that it is cost effective and storage of fabric proves to be simple.

However, attaching a durable fabric to the outside of a residential home or commercial building window is difficult. The high winds of a hurricane require a strong connection holding the fabric over the window. Current methods of holding fabric over a window includes various screw/bolt configurations, or by various straps and tape. Accordingly, it is highly advantageous to provide a strong and secure connection means for a durable and resilient fabric to cover a residential home or commercial window.

SUMMARY OF THE INVENTION

A storm protection system for covering the opening of a building with a flexible material to protect the opening from damage, the opening having a two spaced apart and opposite edges, the system comprising a bracket having a first panel and a second panel, the first panel of the bracket having a first surface, the first surface of the bracket having a plurality of protrusions disposed thereon, the second panel of the bracket having a second surface, the second surface of the bracket including a plurality of corresponding protrusions disposed thereon and a securing means to hold the first panel to the second panel wherein the flexible material is held between the first panel and the second panel.

Another embodiment includes a bracket having a planar portion, the planar portion including an aperture, at least one inclined planar portion extending away from the planar portion, the at least one planar portion having a first edge and an oppositely disposed second edge, the at least one inclined planar portion connected to the planar portion of the bracket at the first edge of the inclined planar portion and an elongated member connected to the at least one inclined planar portion, the elongated member connected to in the inclined planar portion at the second edge wherein the planar portion attaches to an edge of a building opening and the flexible material attaches to the elongated member, the bracket being permitted to flex under stress placed o the bracket by the flexible material by means of the inclined planar portions.

Another embodiment includes a planar bracket having a first end and a second end, the planar bracket made of a resilient material, a first aperture disposed at the first end of the planar bracket, the first aperture of the first end of the planar bracket operable to attach to the edge of the opening of a building and a second aperture disposed at the second end of the planar bracket, the second aperture of the second end of the planar bracket operable to attach to the flexible material.

All embodiments operable to hold a flexible material (fabric, screen . . . etc.) over an opening to a building to protect the opening during a storm.

BRIEF DESCRIPTION OF THE DRAWINGS

FIG. 10 shows a perspective view of the 3-plate bracket of the present invention;

FIG. 11 shows an exploded perspective view of the 3-plate bracket of the present invention;

DETAILED DESCRIPTION OF THE INVENTION

Figure 1:
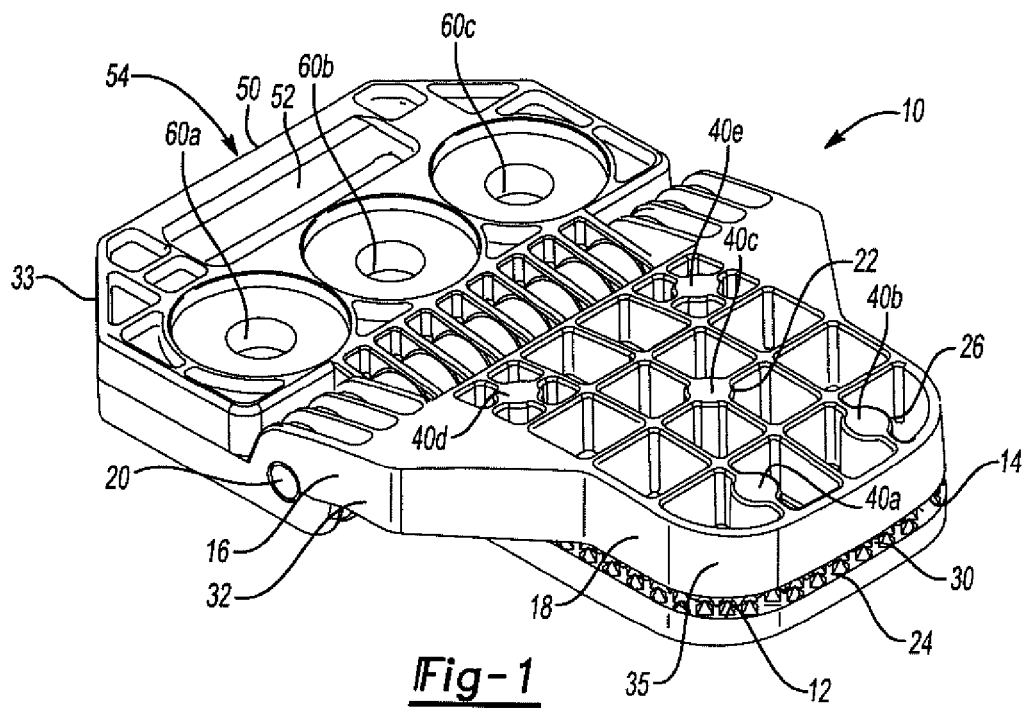
FIG. 1 shows a first embodiment of an X bracket.
Figure 2:
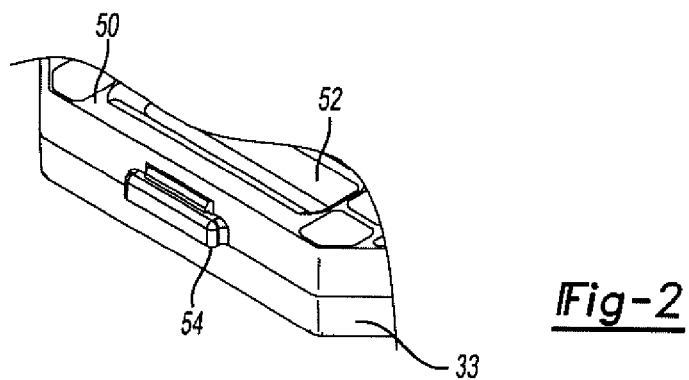
FIG. 2 shows a close up view of the snap connector as shown in FIG. 1.
Figure 3:
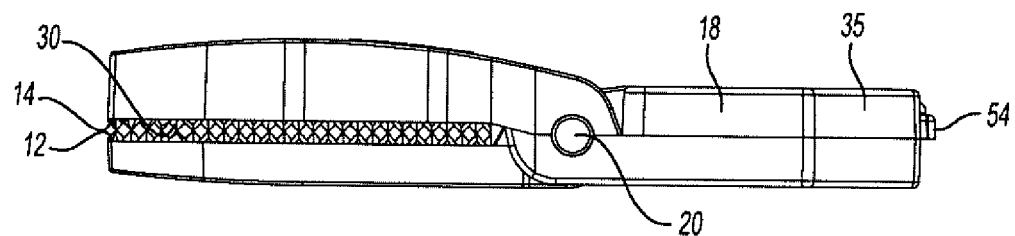
FIG. 3 shows a side view of the bracket of FIG. 1.

The present invention provides for a bracket, or clamp, operable to securely hold in place a piece of fabric to cover a window in preparation for a strong storm or hurricane. The window may either be a residential home window or a commercial building window. Various embodiments of the bracket are shown in FIGS. 1-25 to accommodate for various pieces of fabrics/materials and shapes and sizes of windows.

All of the embodiments below are compatible with various wood, plywood, plastic, polymers, polymer-like materials, plastic-like materials, fabric, fabric-like material, screen, vinyl, clear materials, clear polycarbonate and other similar suitable materials.

All of the embodiments below may include the use of the protrusions to secure the various wood, plywood, plastic, polymers, polymer-like materials, plastic-like materials, fabric, fabric-like material, screen, vinyl, clear materials, clear polycarbonate and other similar suitable materials. These protrusions are generally conical or diamond shaped having a sharp point.

FIGS. 1-5 illustrate a first embodiment of a bracket operable to hold a piece of fabric or other flexible material over a window. The X bracket 10 includes a first member 18 and a second member 16. The first member 18 is a one piece elongated member having a first end 35 and a second end 34. The second member 16 includes a first end 32 and a second end 33. The first member 18 and the second member 16 are pivotable about a first pivot point 20. The first pivot point 20 is a pin extending through the center of the first member 18 and the second member 16. The first end 35 of the first member 18 includes a gripping surface 14.

Figures 4, 5:
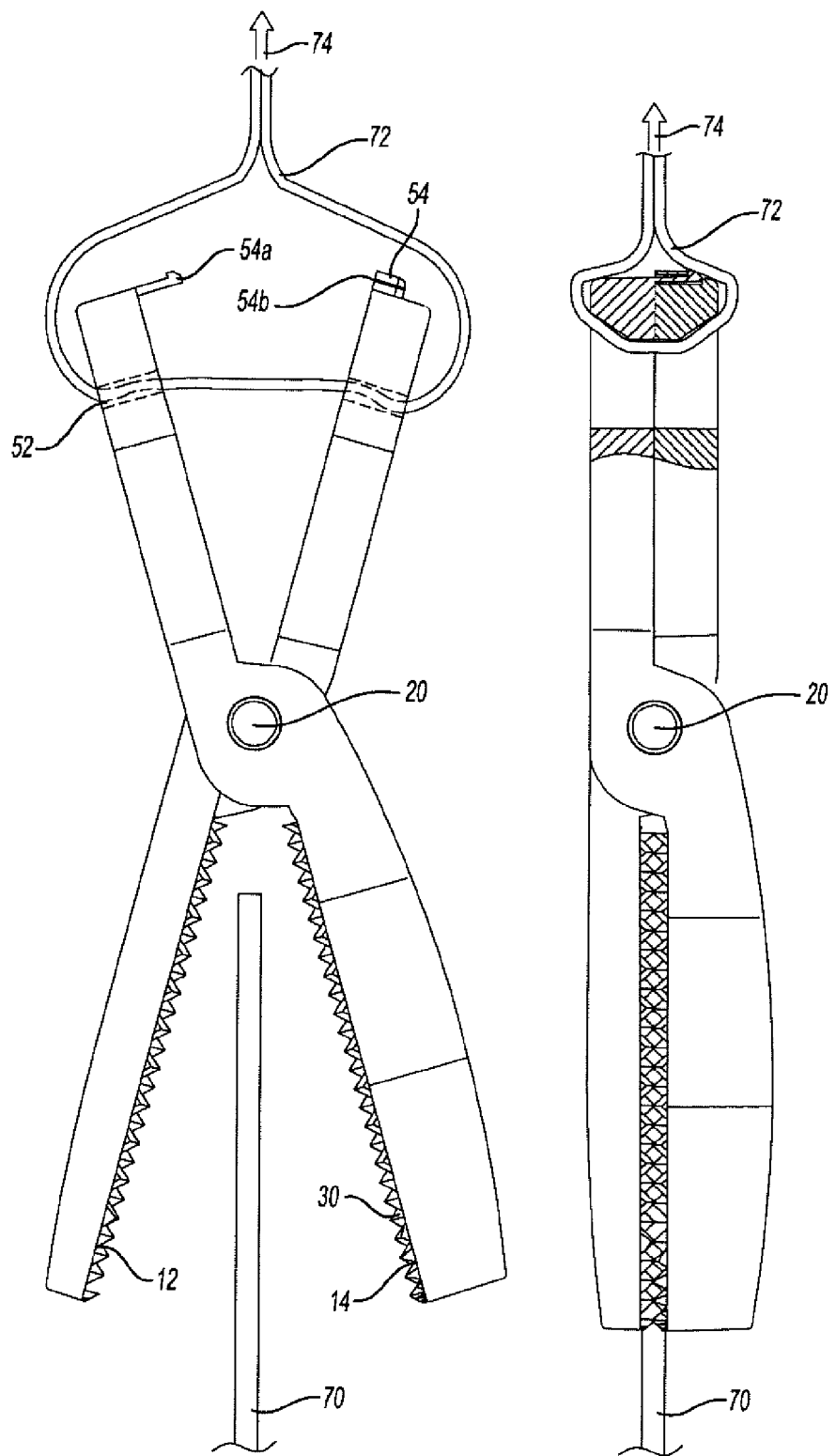
FIG. 4 is an open view of the bracket of FIG. 1.
FIG. 5 shows a closed view of the bracket of FIG. 1.
Figure 6:
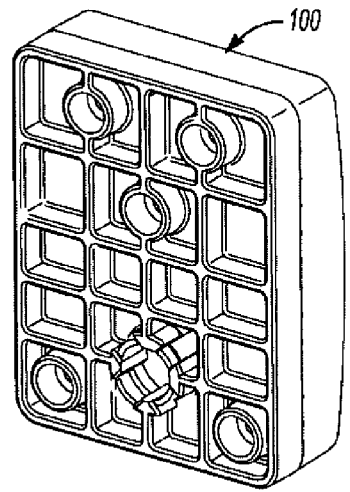
FIG. 6 shows a closes perspective view of the grommet bracket of the present invention.
Figure 7:
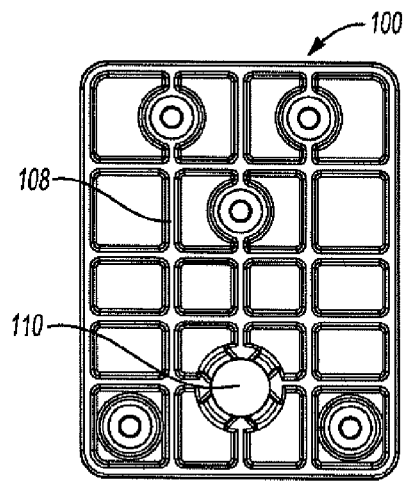
FIG. 7 shows a back view of the grommet bracket of the present invention.
Figure 8:
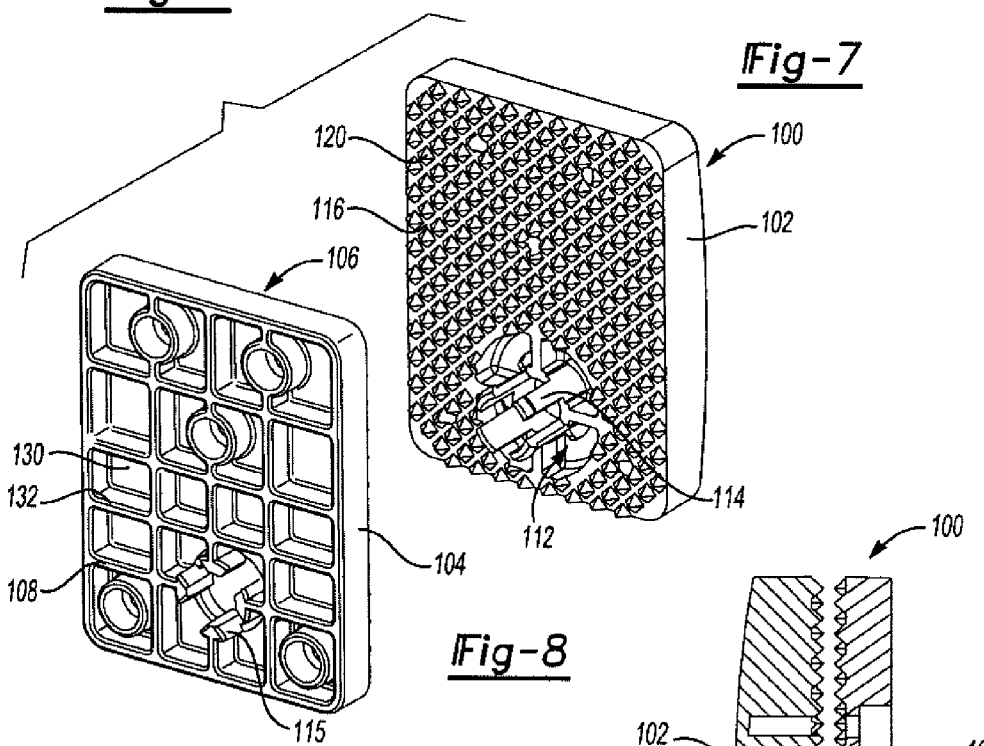
FIG. 8 shows an exploded perspective view of the grommet bracket of the present invention.
Figure 9:
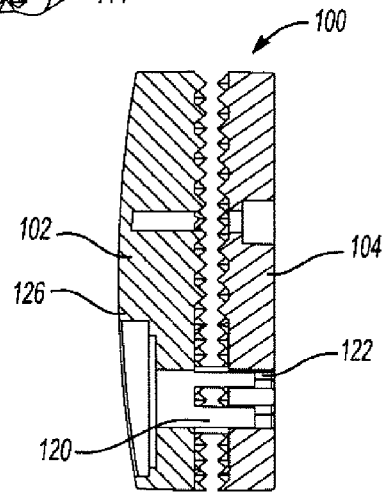
FIG. 9 shows a side view of the grommet bracket of the present invention.
Figures 12, 13:
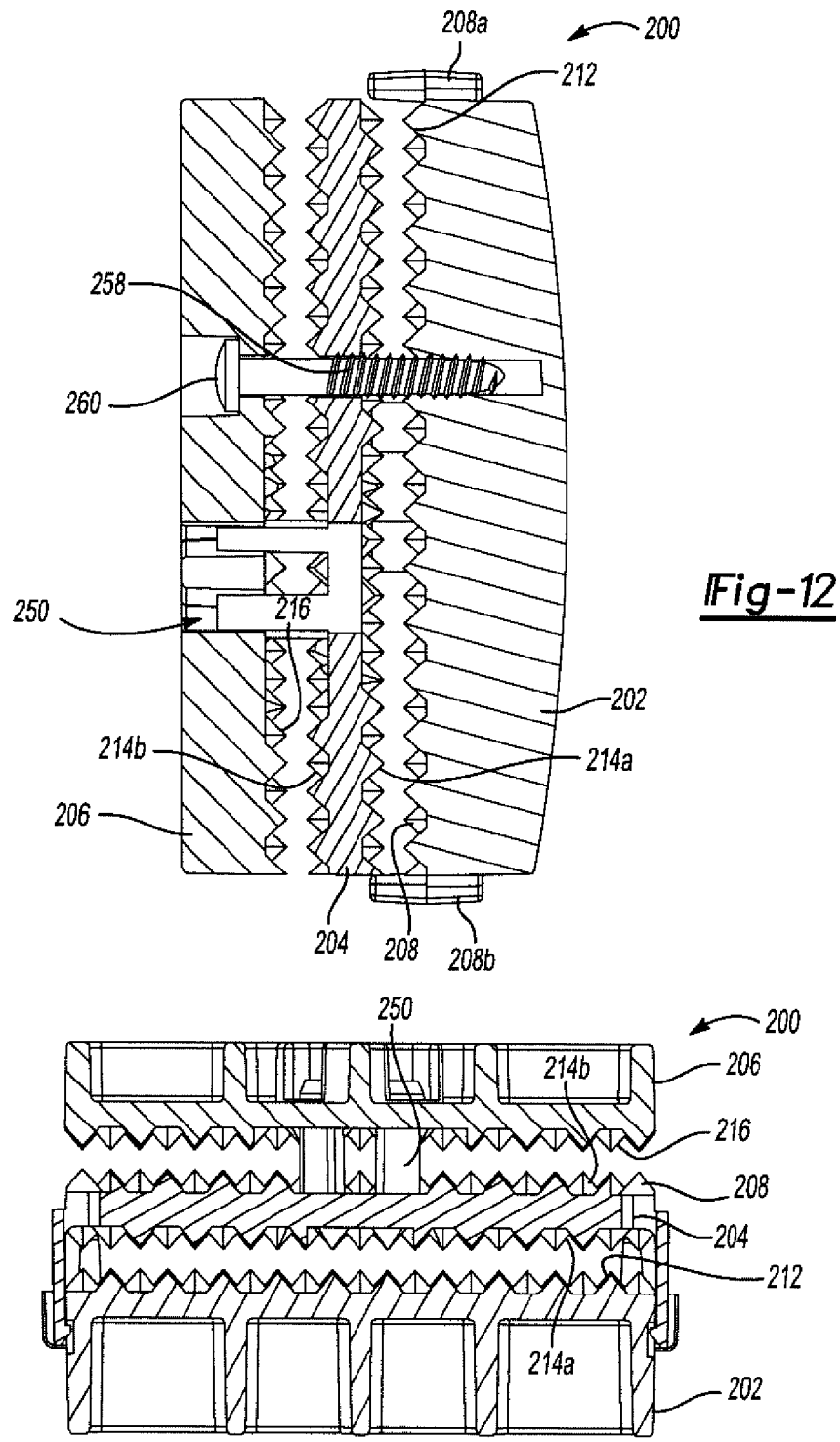
FIG. 12 shows a side view of the 3-plate bracket of the present invention.
FIG. 13 shows an alternative side view of the 3-plate bracket of the present invention.
Figure 14:
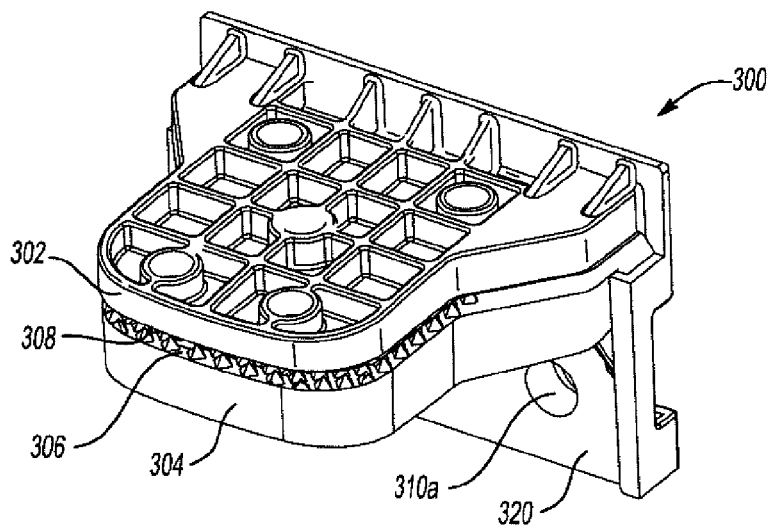
FIG. 14 shows a closed perspective view of the L-bracket of the present invention.
Figure 15:
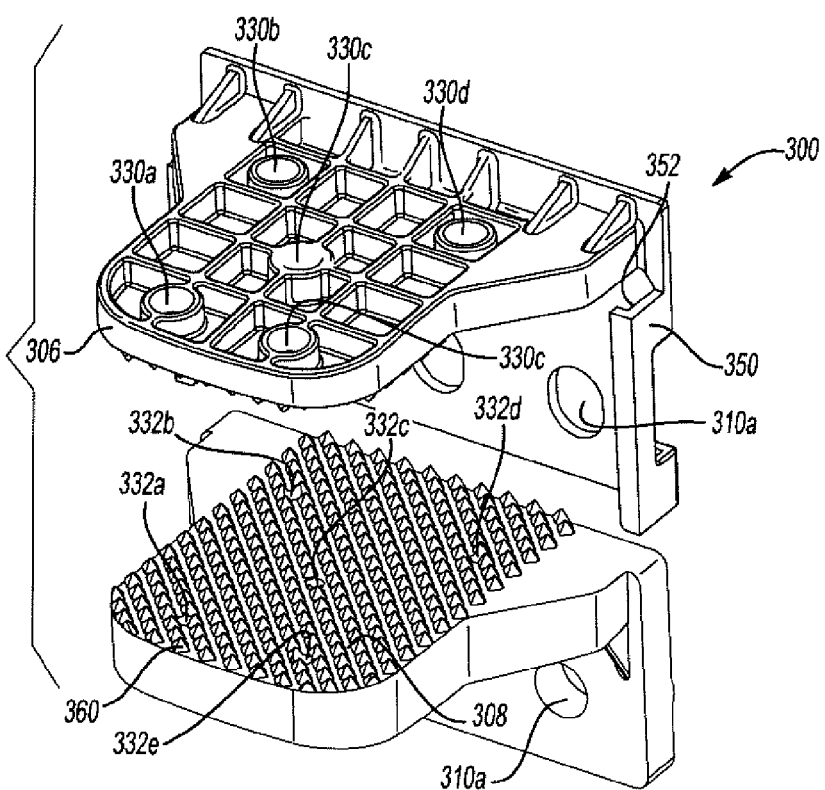
FIG. 15 shows an open perspective view of the L-bracket of the present invention.
Figure 16:
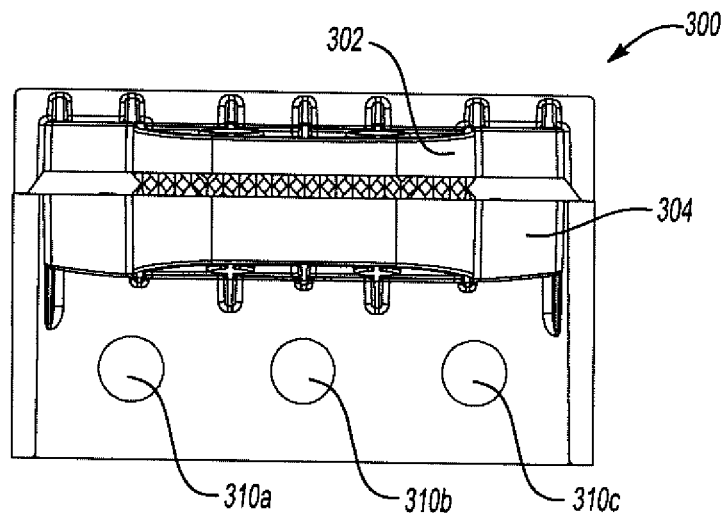
FIG. 16 shows an closed front view of the L-bracket of the present invention.
Figure 17:
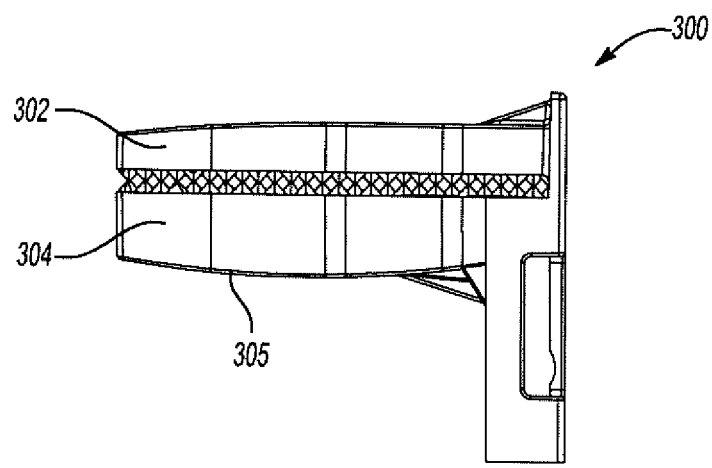
FIG. 17 shows an closed side view of the L-bracket of the present invention.

The gripping surface 14 includes a plurality of sharp protrusions 30. The sharp protrusions 30 are triangular or conical in shape and include a sharp pointed end. The protrusions 30 are generally diamond shaped as shown in the Figures. Correspondingly, the second member 16 includes a second surface 24. The second surface 24 also includes a plurality of protrusions 30. The protrusions 30 of the second surface 24 are also generally triangular or conical in shape having a sharp pointed tip (diamond shaped). In a closed configuration as shown in FIG. 5, a piece of fabric is placed between the first gripping surface 14 and the second surface 24. The protrusions 30 grip the fabric between the first gripping surface 14 and the second surface 24. The protrusions 30 rest between one another in a fully closed position as shown in FIG. 5.

The X bracket 10 further includes a plurality of holes 40a-40e to accommodate screws to further secure the fabric between the first gripping surface 14 and the second surface 24. Furthermore, a plurality of holes 60a-60b can accommodate a securing means to hold the X bracket 10 to a window frame. Furthermore, the slot 52 and inclined ramp 50 are provided to accept a strap 72 to further secure a piece of fabric or other material to cover a window. The strap 72 may be pulled 74 to secure and close the bracket 10.

The X bracket 10 is operable to connect to a building opening edge (such as a window sill or jamb). The bracket may connect to the building by means of a strap connected to the aperture 52 (50), or may directly connect to a building. A piece of flexible material (fabric) is clamped together between the first member (panel) 18 and a second member (panel) 16 and further secured by means of the protrusions 30.

A snap 54 is shown and operable to hold the bracket 10 in a closed position. The snap 54 includes the snap portion 54a and the receiving portion 54. The snap portion 54a may further includes a small protrusion to facilitate a secure connection and closure of the snap 54.

FIGS. 6-9 show a second embodiment of the bracket in the form of a two plate bracket. This bracket is also referred to as a grommet bracket 100. A first plate 102 and a second plate 104 are fitted together to hold a piece of fabric to a window.

The first plate 102 includes a first surface 106 having a plurality of protrusions 120. The protrusions 120 include a sharp point and are operable to tightly secure a piece of fabric between the first plate 102 and the second plate 104. The second plate 104 includes a second surface 106. The second surface 106 also includes a plurality of protrusions 120. The protrusions are generally diamond shaped. The two plate bracket 100 further includes a screw hole 110 operable to accept a bolt, screw, or other securing means. Furthermore, securing mechanism 112 includes two projections 114 to fit within the screw hole 110. The securing means 112 is operable to tightly secure the first plate 102 to the second plate 104.

The grommet bracket 100 includes the securing means 112 for attaching the first place 102 to the second plate 104 together and for securing a piece of fabric, screen, strap . . . etc. between the two plates 102, 104 to secure the fabric, screen, strap . . . etc. to a building or window (or other). The securing means includes structure on both plates 102, 104. The first plate 102 includes a plurality of protrusions 114 operable to be accepted by receiving structure 115 on the second plate. The protrusions 114 include structure to secure and snap the plates together.

The diamond structure protrusions 120 (and with all diamond like protrusions in the present invention) are operable to grip fabric or fabric like materials. The protrusions 120 are generally diamond shaped (see figures) and are slightly spaced apart. The protrusions 120 have corresponding protrusions to next together and to encourage snapping of the two plates 102, 104 together.

FIGS. 10-13 show a third embodiment of the bracket having a three plate configuration. The three plate bracket 200 includes a first plate 202, a second plate 204, and a third plate 206. The first plate 202 includes a first surface 212. The first surface 212 includes a plurality of protrusions 208, as described above. The second plate 204 is the middle plate and includes a second surface 214a and a third surface 214b. The second surface 214a and the third surface 214b also include a plurality of protrusions 208. The third plate 206 includes a fourth surface 216 also including a plurality of protrusions 208. The three plate bracket 200 is adapted to secure two pieces of fabric to cover a window. Securing means 210 provided on the first plate 202 secures the first plate 202 to the second plate 204 and to the third plate 206. Further securing protrusions 208 and 20b provide for extra securing means of the three plate bracket.

The securing member 250 of the 3 plate bracket 200 includes a plurality of protrusions 254 having separate tabs 252. The protrusions 254 and tabs 252 are operable to secure to the receiving structure 256 located on the third plate 206. The second plate 204 and the third plate 206 snap together by means of the securing member 250. The two plates 204, 206 including the protrusions 208 are operable to hold a fabric, screen, strap . . . etc. between the two plates 204, 206. The protrusions 208 prevent movement of the fabric, screen, strap . . . etc. The fabric, screen, strap . . . etc. may include a grommet or other aperture to fit around the securing member 250.

The first plate 202 and the second (middle) plate 204 are secured together by means of the snap 210. The snap 210 is located on the middle/second plate 204. Corresponding connecting structure is located on the first plate 202. This structure includes guiding members 213 and receiving indentation 211. The snap 210 is operable to secure the first plate 202 to the second plate 204 to hold a piece of fabric, screen, strap . . . etc. for use in mitigating damage to windows/doors during hurricane conditions.

The bracket 200 may be used to either secure two flexible materials (i.e. strap and fabric) together. The bracket 200 may then be mounted to an opening to a building (window or door) by means of one or more bolts through the apertures.

A fourth embodiments is shown as a 90 degree bracket L-shaped bracket 300 in FIGS. 14-17 and FIG. 25. The 90 degree bracket 300 has a generally L-shaped design. The bracket 300 includes a first plate 302 and a second plate 304. The first plate 302 includes a first surface 306. The second surface 304 includes a second surface 308. Again, as in previous embodiments, the first surface 306 and the second surface 308 include a plurality of protrusions to secure a piece of fabric between the first surface 306 and the second surface 308. The bracket 300 further includes a base 320. The first plate 302 and the second plate 304 connect to the base 320. Furthermore, a plurality of holes 310a, 310b and 310c are provided to secure the bracket 300 to a window frame, or other building portion, to hold the bracket 300 in place.

Figure 25:
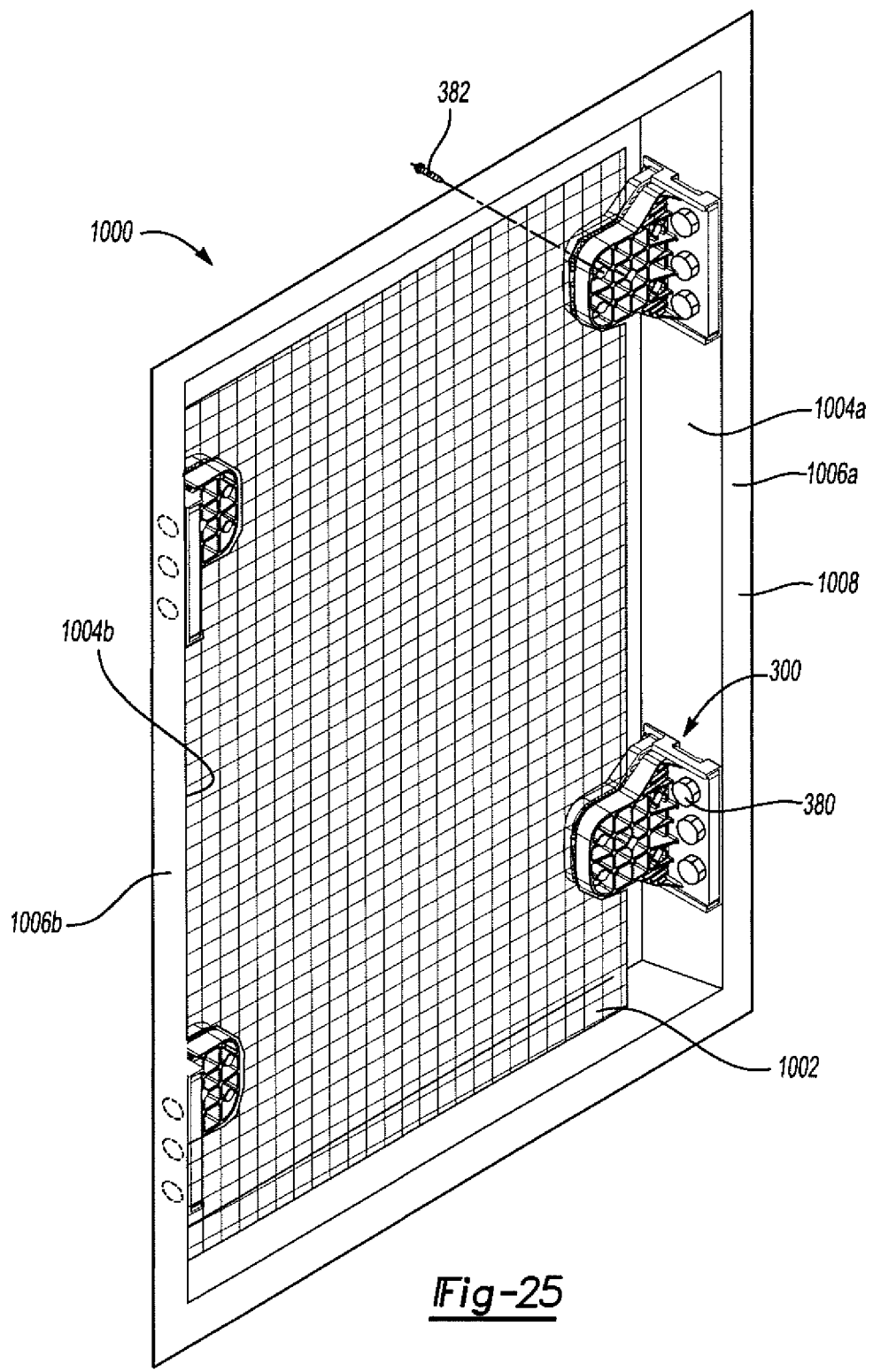
FIG. 25 illustrates a typical building opening for use in any of the embodiments of the present invention.

FIG. 25 illustrates a typical arrangement of the bracket 300 (and for any of the brackets disclosed in the present invention). The arrangement as shown in FIG. 25 may be implemented for any of the brackets outlined in this specification. All of the brackets disclosed and as shown in the Figures are operable to connect to a flexible material (fabric, screen, strap) and further connect to an edge of a building opening. FIG. 25 illustrates a window and cover arrangement 1000 having a screen 1002. The window includes spaced apart oppositely positioned edges 1006a, 1006b having an inside perimeter 1004a, 1004b. In the present embodiment, the brackets 300 are attached to the inside perimeter 1004a, 1004b of the window. All other arrangements of the present invention include the bracket being mounted to the planar portion 1008 of the edges 1006a, 1006b. In the present embodiment, screws of bolts 382 further secure the bracket together around the flexible material 1002. Further, fasteners or bolts 380 attached the bracket 300 to the window.

Figure 18:
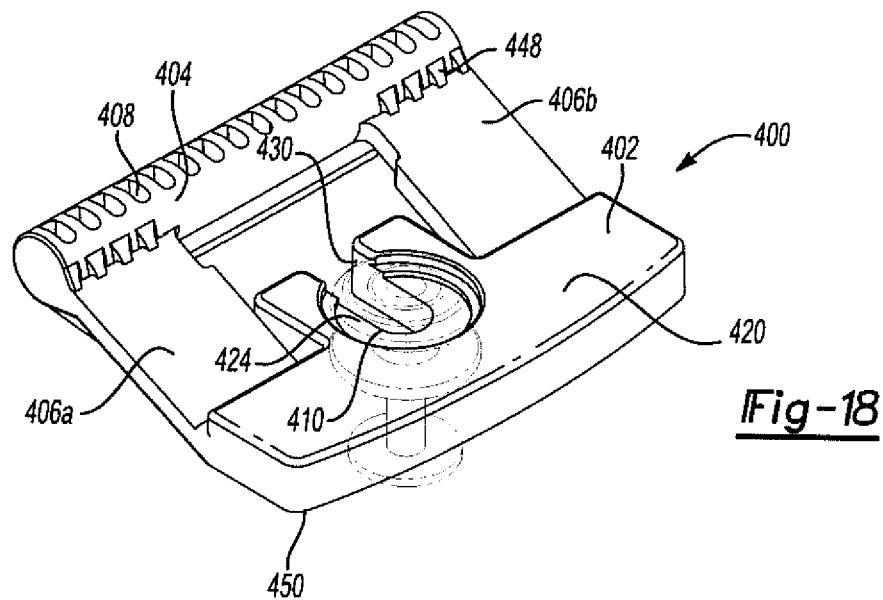
FIG. 18 shows a perspective view of the flex bracket of the present invention.
Figure 19:
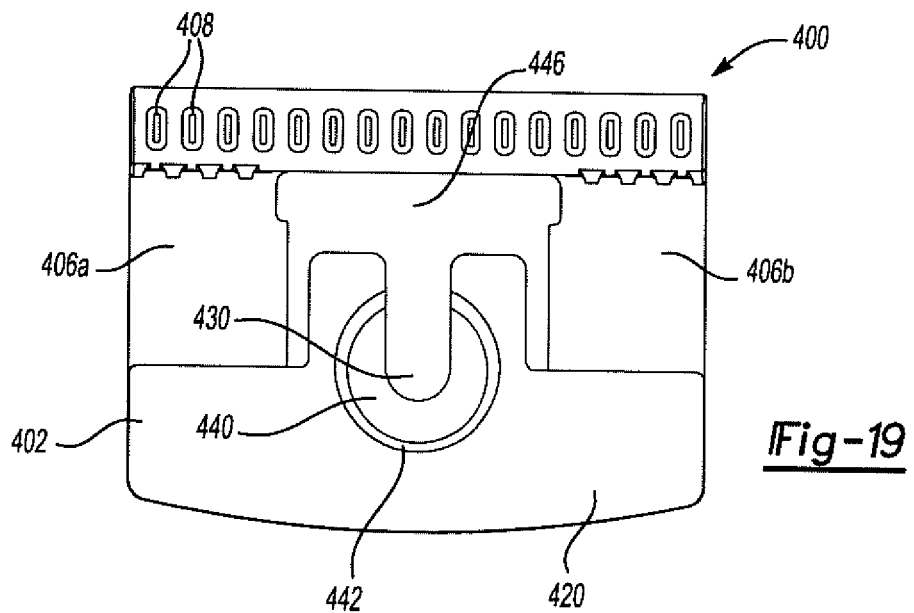
FIG. 19 shows a top view of the flex bracket of the present invention.
Figure 20:
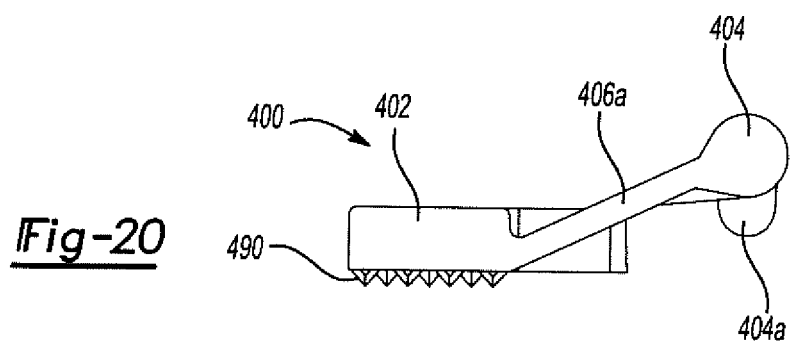
FIG. 20 shows a side view of the flex bracket of the present invention.
Figure 21:
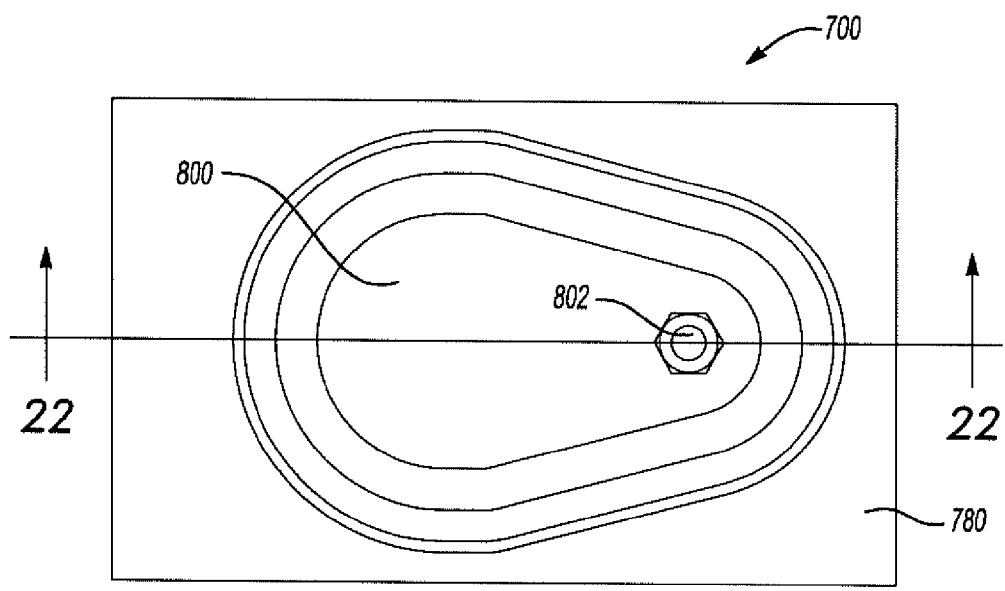
FIG. 21 shows a top view of a cover for the stretch bracket of the present invention.
Figure 22:
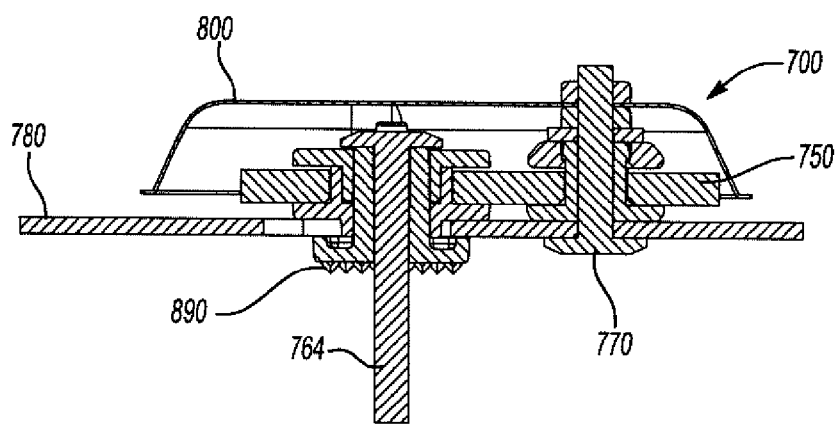
FIG. 22 shows a side cross sectional view of the stretch bracket of the present invention.
Figure 23:
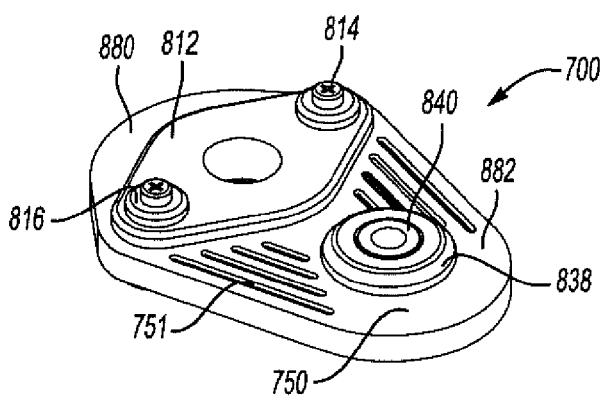
FIG. 23 shows a perspective view of the stretch bracket of the present invention.
Figure 24:
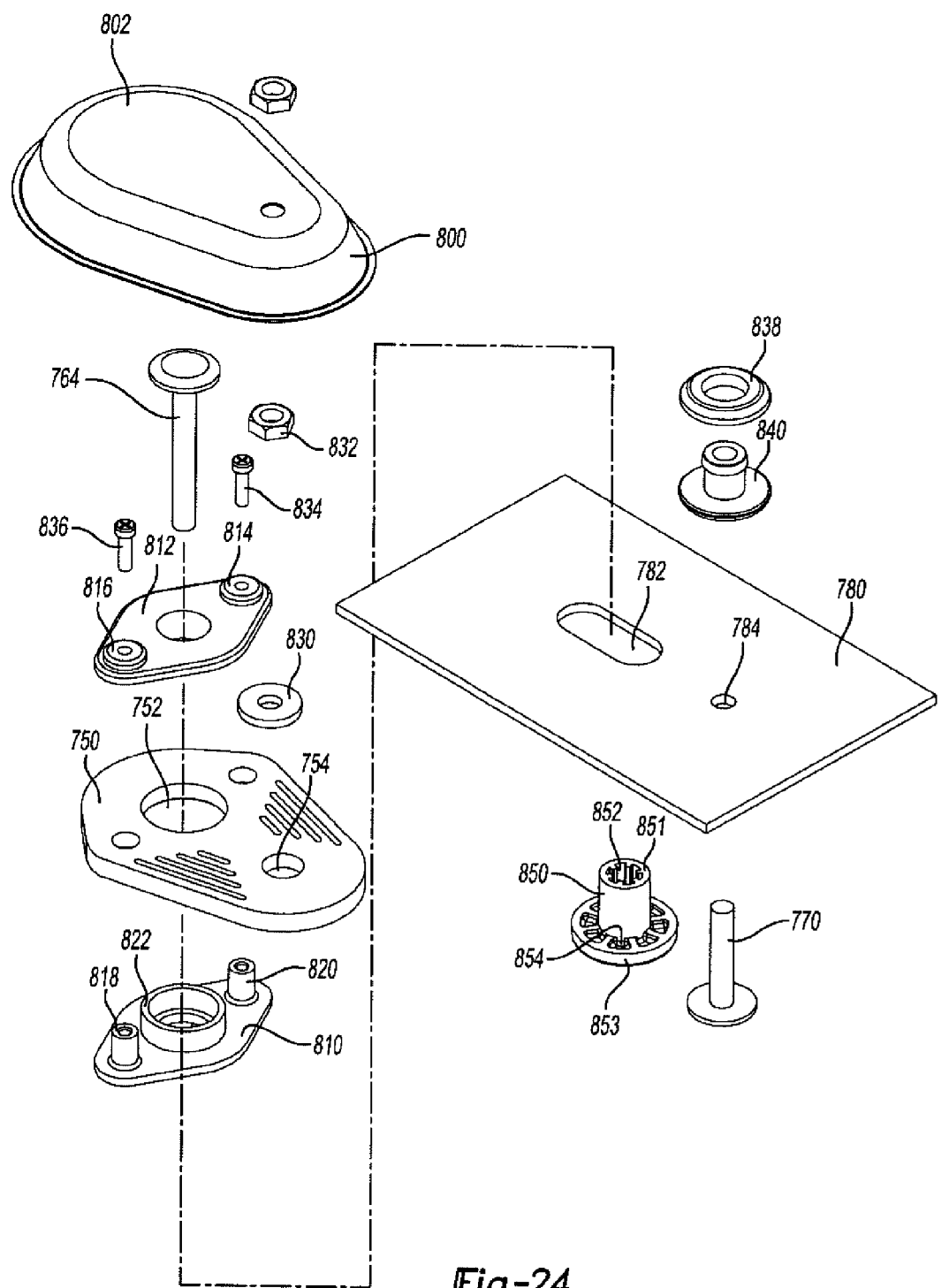
FIG. 24 shows an exploded perspective view of the stretch bracket of the present invention.

FIGS. 18-20 show a fifth embodiment and provide for a flex bracket 400 allowing for a strap or other piece of material/fabric to be secured to a flat panel, such as a wall. The base portion 402 is rectangular and has a planar bottom surface. A pair of inclined planar portions or arms 406a, 406b extend from one side of the base 402 to extend to a cylindrical portion 404. The arms 406a, 406b angle outwardly from a planar bottom surface to support a cylindrical portion 404 at a position spaced away from the surface of the wall. The base 402 has a rectangular mounting portion which extends from the side between the arms 406a, 406b. A mounting slot 430 is formed in a mounting portion to accept a fastener 424 as shown in FIG. 18. A strap (not shown) is mounted about the cylindrical portion (elongated) 404 to hold the covering in place. Because the axis of the fastener is on the opposite side of the edge of the planar surface from which the arms extend, the mounting portion resists the prying force generated by the strap.

The flex bracket 400 may further include a plurality of protrusions 490. The protrusions 490 are adapted and operable to engage an opening of a building (wood, plywood, polymer, plastic . . . etc.) to further support and secure the flex bracket 400. The bracket 400 works particularly well when attached to plywood and polycarbonate.

The planar portion or base 402 includes the mounting aperture or slot 430. The slot 430 is adapted to accept a bolt 410. The head of the bolt 410 rests within one of the indentations 440, 442. The indentations 440, 442 are generally circular and concentric around each other. The indentations 440, 442 are adapted to secure the head of a bolt and prevent the head of a bold from moving out of the slot 430. The base 402 is mounted to an edge around a window (as shown in FIG. 25) by the connecting bolt 424. The strap connects to the cylindrical member 404. The bracket 400 is then permitted to flex (because of the arms 406a, 406b and the resilient material the bracket 400 is comprised of) under high winds and stress. The movement is shown in FIG. 20 at reference numeral 404A.

The bracket 400 further includes support members 448 connecting the arms (inclined planar portions) 406a, 406b to the elongated cylindrical member 404. The cylindrical portion 404 further includes indentations 408.

A last embodiment as shown in FIGS. 21-24 shows a stretch bracket 700 for connecting a panel (fabric, polycarbonate, clear polycarbonate, wood, plexiglass, or otherwise) to a window. The bracket 700 works particularly well when attached to plywood and polycarbonate. The stretch bracket 700 includes two apertures 752, 754. The first aperture 752 connects to a panel 780 by means of a fastener 764. The second aperture 754 connects to a window frame, or building, by means of a fastener 770 to secure the flexible material (or panel, strap, screen . . . etc.) over the building opening. The bracket 700 is made of a highly resilient elastic rubber capable of stretching and flexing as the panel moves with the wind of severe weather. Grooves 751 are provided on the resilient elastic rubber to facilitate flexing of the stretch bracket 700. The above describe configuration may also be reversed (i.e. the first aperture is connected to the window frame (rather than the flexible material)).

The stretch bracket 700 may further include a plurality of protrusions 890. The protrusions 890 are adapted and operable to engage an opening of a building (wood, plywood, polymer, plastic . . . etc.) to further support and secure the flex bracket 700.

The bracket 700 includes a flex portion 750 having a first end 880 and a second end 882. The first aperture 752 is provided at the first end 880 of the flex portion 750. The second aperture 754 is provided at the second end 882 of the flex portion 750. Various fasteners and bolts 764, 770 to secure the portions of the bracket 700 together.

A cover 800 is also provided to cover the bracket 700. The cover 800 is curved and generally aesthetically appealing. The bolt 770 extends through the cover 800 and is cured by means of the nut 802.

Support portions 810, 812 serve to facilitate and support the flex portion 750. The support portion 810 includes grommets 816, 814 operable to connect to the bolts 818, 820 of the support portion 810. The support portion 810 further includes fastener 822.

Twist bolt 850 is provided to secure the portions of the bracket 700 together. The bolt 850 may be used through either the first aperture 752 or the second aperture 754. The bolt includes an upper portion 851 and a lower portion 853. The upper portion 851 includes gear mechanism 852. The lower portion 853 includes indentations 854 to facilitate securing of the bolt 850 within the bracket 700.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art.

The invention claimed is:

1. A storm protection system for covering an opening of a building with a material to protect the opening from damage, the opening having two spaced apart and opposite edges, the system comprising:

a planar bracket having a first end and a second end, the planar bracket made of a resilient material, the planar bracket having a planar surface;

a first aperture disposed at the first end of the planar bracket, the first aperture of the first end of the planar bracket operable to attach to one of the edge of the opening of a building or the material;

a second aperture disposed at the second end of the planar bracket, the second aperture of the second end of the planar bracket operable to attach to the other of the edge of the opening of the building or the material thereby allowing the material to indirectly connect to the edge of the opening of the building;

a support panel connected to the planar bracket, the support panel having a planar surface, the support panel connecting to one of the first aperture or the second aperture of the planar bracket, the support panel mounted to the planar bracket so that the planar surface of the planar bracket is parallel to and in contact with the planar surface of the support panel.

2. The storm protection system of claim 1 wherein the planar bracket includes a plurality of elongated indentations to facilitate flexibility, the indentations positioned on a surface of the planar bracket opposite the support panel.

3. The storm protection system of claim 1 wherein a cover member is disposed over, connected to, and operable to cover the planar bracket, the cover having a curved upper portion, the cover adapted to cover the planar bracket.

4. The storm protection system of claim 1 wherein at least one support plate mounts to the first aperture.

5. The storm protection system of claim 1 wherein a plate having a first aperture and a second aperture are connected to the planar bracket.

6. The storm protection system of claim 5 wherein the first aperture of the plate is elongated.

7. The storm protection system of claim 1 wherein the bracket includes a plurality of integrally formed protrusions, the protrusions adapted and operable to engage an opening of a building to further support and secure the storm protection system.

8. The storm protection system of claim 7 wherein the protrusions are generally conical shaped.

9. The storm protection system of claim 1 wherein the planar bracket is made of elastic rubber capable of stretching and flexing as the material moves in severe weather.

10. The storm protection system of claim 3 wherein the cover is secured to the planar bracket by means of a bolt extending through both the planar bracket and the cover.

11. The storm protection system of claim 3 wherein a lower portion of the cover connects to a lower portion of the planar bracket.

12. The storm protection system of claim 3 wherein the cover includes an outer peripheral edge, the outer peripheral edge of the cover operable to mimic with an outer peripheral edge of the planar bracket.

13. The storm protection system of claim 1 wherein a support portion is provided around at least one of the apertures of the planar bracket, the support portion having a surface operable to mount connected to and parallel with the planar bracket.

14. The storm protection system of claim 1 wherein the material operable to cover the opening is a fabric.

* * * * *